US011364802B2

(12) United States Patent
Fogelklou

(10) Patent No.: US 11,364,802 B2
(45) Date of Patent: Jun. 21, 2022

(54) METHOD AND SYSTEM FOR PASSIVE START OF A VEHICLE

(71) Applicant: POLESTAR PERFORMANCE AB, Goeteborg (SE)

(72) Inventor: Christopher Fogelklou, Gothenburg (SE)

(73) Assignee: POLESTAR PERFORMANCE AB, Goeteborg (SE)

( * ) Notice: Subject to any disclaimer, the term of this patent is extended or adjusted under 35 U.S.C. 154(b) by 0 days.

(21) Appl. No.: 16/108,156

(22) Filed: Aug. 22, 2018

(65) Prior Publication Data
US 2019/0070958 A1 Mar. 7, 2019

(30) Foreign Application Priority Data
Sep. 4, 2017 (EP) ..................................... 17189215

(51) Int. Cl.
*B60K 28/12* (2006.01)
*B60R 25/24* (2013.01)

(52) U.S. Cl.
CPC .............. *B60K 28/12* (2013.01); *B60R 25/24* (2013.01); *B60R 2325/101* (2013.01)

(58) Field of Classification Search
CPC .... B60K 28/12; B60R 25/24; B60R 2325/101
See application file for complete search history.

(56) References Cited

U.S. PATENT DOCUMENTS 6,567,012 B1 * 5/2003 Matsubara .............. B60R 25/24
340/12.18
8,643,510 B2 2/2014 Schraebler et al.
(Continued)

FOREIGN PATENT DOCUMENTS

CN 101932481 A 12/2010
CN 101967914 A 2/2011
(Continued)

OTHER PUBLICATIONS

Extended European Search Report dated Mar. 1, 2018, Application No. 17189215.1-1132—Applicant Volvo Car Corporation, 5 Pages.
(Continued)

*Primary Examiner* — Navid Z. Mehdizadeh
(74) *Attorney, Agent, or Firm* — Brooks Kushman P.C.

(57) ABSTRACT

The disclosure relates to a method performed by a within-vehicle-confirming system on-board a vehicle for establishing that a key device is within an interior of the vehicle. The system determines that there is a secure communication link between the vehicle and the key device. The system further provides a vehicle sound signal within the interior of the vehicle. Moreover, the system receives from the key device a key device signal via the secure communication link, which key device signal is derived from a sound signal detected by one or more sensors associated with the key device. The system further compares the vehicle sound signal with the key device signal, and enables a start of the vehicle when the key device signal matches the vehicle sound signal. The disclosure also relates to a within-vehicle-confirming system in accordance with the foregoing, and to a vehicle at least partly comprising such a system.

16 Claims, 8 Drawing Sheets

(56) References Cited

U.S. PATENT DOCUMENTS

| | | | |
|---|---|---|---|
| 8,863,256 B1 | 10/2014 | Addepalli et al. | |
| 9,608,970 B1 * | 3/2017 | Gehret | H04L 63/062 |
| 10,223,854 B2 | 3/2019 | Hu et al. | |
| 10,645,587 B2 | 5/2020 | Mathison et al. | |
| 2006/0114100 A1 | 6/2006 | Ghabra et al. | |
| 2009/0217043 A1 | 8/2009 | Metke et al. | |
| 2011/0068895 A1 | 3/2011 | Gee et al. | |
| 2011/0140926 A1 | 6/2011 | Schräbler et al. | |
| 2011/0153121 A1 | 6/2011 | Minassian | |
| 2012/0263020 A1 * | 10/2012 | Taylor | G01S 3/8006 367/124 |
| 2014/0215567 A1 * | 7/2014 | Yoshizawa | G07C 9/00309 726/3 |
| 2014/0236461 A1 | 8/2014 | Edgren | |
| 2014/0293753 A1 | 10/2014 | Pearson | |
| 2015/0084753 A1 | 3/2015 | Biondo et al. | |
| 2015/0102906 A1 * | 4/2015 | Gerhardt | G07C 9/00309 340/5.61 |
| 2015/0184628 A1 | 7/2015 | Fan | |
| 2015/0271601 A1 * | 9/2015 | Boss | G08G 1/166 381/2 |
| 2016/0036788 A1 | 2/2016 | Conrad et al. | |
| 2016/0272153 A1 | 9/2016 | Ogura et al. | |
| 2016/0288770 A1 | 10/2016 | Hermann et al. | |
| 2017/0026910 A1 | 1/2017 | Scheim et al. | |
| 2017/0349143 A1 | 12/2017 | Menard et al. | |
| 2018/0326947 A1 | 11/2018 | Oesterling et al. | |
| 2019/0047511 A1 * | 2/2019 | Link, II | B60R 25/24 |

FOREIGN PATENT DOCUMENTS

| | | | | |
|---|---|---|---|---|
| CN | 102019905 A | 4/2011 | | |
| CN | 106004784 A | 4/2014 | | |
| CN | 103991450 A | 8/2014 | | |
| CN | 106394486 A | 2/2017 | | |
| CN | 106452721 A | 2/2017 | | |
| CN | 107274570 A | 10/2017 | | |
| CN | 107650863 A | 2/2018 | | |
| CN | 107276748 A | 10/2020 | | |
| EP | 1747955 B1 * | 3/2008 | | B60R 25/24 |
| EP | 2251838 A2 | 11/2010 | | |
| EP | 2743868 A1 | 6/2014 | | |
| EP | 3321892 A1 | 5/2018 | | |
| JP | 2014058817 A | 4/2014 | | |
| WO | 9940546 A1 | 8/1999 | | |
| WO | 2008/044093 A1 | 4/2008 | | |
| WO | 2009/095472 A2 | 8/2009 | | |
| WO | 2016135019 A1 | 9/2016 | | |

OTHER PUBLICATIONS

First Office Action for Chinese Application No. 201810653506.0, dated Nov. 2, 2020, 9 pages.

Third Office Action for Chinese Application No. 201810653506.0, dated Dec. 3, 2021, 7 pages.

* cited by examiner

METHOD AND SYSTEM FOR PASSIVE START OF A VEHICLE

CROSS-REFERENCE TO RELATED APPLICATIONS

This application claims foreign priority benefits under 35 U.S.C. § 119(a)-(d) to European patent application number EP 17189215.1, filed Sep. 4, 2017, now European Patent No. EP 3450265 B1, which issued Dec. 18, 2019, which is incorporated by reference in its entirety.

TECHNICAL FIELD

The present disclosure relates to—prior to enabling an operator in possession of a key device to initiate a passive start of a vehicle—establishing that the key device is within an interior of said vehicle

BACKGROUND

Many of today's vehicles are equipped with keyless entry systems and furthermore passive start systems enabling access to and start of the vehicle without the use of traditional mechanical keys. A vehicle equipped with such systems may be able to unlock its doors upon detecting a smart vehicle key such as an electronic key fob associated with the vehicle, and furthermore to start the vehicle when the driver, e.g., pushes a start button within the vehicle, without the driver having to actuate said key fob. There are mobile phone applications providing the functionality of an electronic key fob, thus enabling mobile phones to be used in place of such key fobs to control said unlocking of vehicle doors and passive start of the vehicle. To allow passive start, however, regulations commonly require that the mobile phone must be positioned inside the vehicle.

US 2017/0026910 A1, for instance, discloses a passive entry passive start portable device detection system. For sensing whether the portable device—such as a mobile phone—is inside the vehicle or outside the vehicle, low frequency antennas are positioned on respective sides of the vehicle, transmitting a low frequency field. When the vehicle receives a return signal from the portable device, the signal strength thereof is measured. The received signal strength indicator (RSSI) indicates a proximity of the portable device to the vehicle; the higher the RSSI, the closer the portable device is assumed to be to the vehicle.

However, although the approach with the transmitted low frequency field disclosed in US 2017/0026910 A1 enables proximity detection of the mobile phone and accordingly the ability to determine if the mobile phone is close to the vehicle, it remains a challenge to establish whether the mobile phone is actually inside rather than outside the vehicle.

SUMMARY

It is therefore an object of embodiments herein to provide an approach for—prior to enabling an operator in possession of a key device to initiate a passive start of a vehicle—establishing that the key device is within an interior of said vehicle.

According to a first aspect of embodiments herein, the object is achieved by a method performed by a within-vehicle-confirming system on-board a vehicle for, prior to enabling an operator in possession of a key device to initiate a passive start of the vehicle, establishing that the key device is within an interior of the vehicle. The within-vehicle-confirming system establishes a secure communication link between the vehicle and the key device. The within-vehicle-confirming system furthermore provides a vehicle sound signal within the interior of the vehicle. Moreover, the within-vehicle-confirming system receives from the key device a key device signal via the secure communication link, which key device signal is derived from a sound signal detected by one or more sensors associated with the key device. The within-vehicle-confirming system further compares the sound signal with the key device signal. Moreover, the within-vehicle-confirming system enables a start of the vehicle, when the key device signal matches the vehicle sound signal, i.e., when the within-vehicle-confirming system determines that the key device signal detected by the key device corresponds to the vehicle sound signal that was emitted by the within-vehicle-confirming system.

Thereby, an approach is provided according to which a passive start may be avoided should the key device be outside rather than inside the vehicle. That is, since there is determined that there is a secure communication link between the vehicle and the key device, it is established that the vehicle and key device are wirelessly connected and may communicate in a trusted manner, blocking out the possibility of eavesdropping. Subsequently, the key device may be utilized for potentially opening and furthermore potentially starting the vehicle. Moreover, that is, since there is provided a vehicle sound signal within the interior of the vehicle, there is emitted—e.g., by means of a loudspeaker—a signal of sound inside the vehicle, thus detectable therein. Thereby, unlike short-wavelength signals such as, e.g., Bluetooth and/or Wi-Fi signals, which—should they be emitted within the vehicle—would extend outside and/or beyond the chassis of the vehicle, sound signals—with their longer wavelengths—are to a greater extent limited to a range within the vehicle. Furthermore, that is, since there is received—from the key device—a key device signal via the secure communication link, which key device signal is derived from a sound signal detected by one or more sensors associated with the key device, there is derived in a trusted manner from the key device a signal which is based on a signal of sound detected by, e.g., a key device microphone. Moreover, that is, since the vehicle sound signal is compared with the key device signal, similarities and/or correlations between the vehicle sound signal provided within the vehicle and the key device signal—subsequently the sound signal detected by the key device sensor(s)—are analyzed. Furthermore, that is, since a start of the vehicle is enabled when the key device signal matches the vehicle sound signal, start of the vehicle is enabled only if the key device signal is determined to match the vehicle sound signal. Subsequently, a start of the vehicle is enabled only if the sound signal detected by the key device sensor(s) is considered to match the sound signal provided within the vehicle, which implies that the key device sensor(s) has detected the vehicle sound signal. This in turn implies that the key device is within an interior of the vehicle, rather than outside the vehicle. Accordingly, a start of the vehicle is enabled only when the key device is within the vehicle, which thus reduces the risk of accidentally enabling start of the vehicle while the key device is outside the vehicle.

For that reason, an approach is provided for—prior to enabling an operator in possession of a key device to initiate a passive start of a vehicle—establishing that the key device is within an interior of said vehicle.

The technical features and corresponding advantages of the above-mentioned method will be discussed in further detail below.

By introducing a method performed by a within-vehicle-confirming system on-board a vehicle for—prior to enabling an operator in possession of a key device to initiate a passive start of the vehicle—establishing that the key device is within an interior of the vehicle, an approach is provided according to which a passive start may be avoided should the key device be outside rather than inside the vehicle. The "within-vehicle-confirming system" may fully or at least partly be comprised in, be integrated with and/or be connected to the vehicle, for instance be distributed between one or more nodes such as ECUs ("Electronic Control Units") thereof. Moreover, "within-vehicle-confirming" system may refer to "positioned-within-vehicle confirming" system and/or "proximity confirming" system. The expression "on-board" a vehicle may refer to "at least partly comprised in" a vehicle, whereas "prior to" enabling may refer to "before" enabling. "Operator" may refer to "driver" and/or "potential driver" and/or any party that is authorized to access and/or move the vehicle, whereas operator "in possession of" a key device may refer to operator "carrying and/or associated with" a key device. "Key device" may refer to "electronic key device", and furthermore to "portable and/or handheld key device". Moreover, the "key device" may for instance be represented by a smartphone and/or a smartwatch, or an equivalent and/or successor thereof. Furthermore, the "key device" may refer to a portable device adapted to be carried by the operator, establish a secure communication link with the vehicle and/or the within-vehicle-confirming system and/or a control unit associated therewith, run software and comprise one or more sensors. "Initiate" a passive start may refer to "enable", "request" and/or "initiate by means thereof" a passive start, and further to "initiate via a secure communication link between said key device and said vehicle and/or said within-vehicle-confirming system" a passive start. Furthermore, the expression "passive start" may refer to "start" and further to "start without interaction by said operator with said key device". Moreover, "passive start of said vehicle" may refer to "passive start of driving means and/or an engine of said vehicle". "Establishing" that the key device is within an interior of the vehicle may refer to "determining" and/or "confirming" that the key device is within an interior of the vehicle. Furthermore, the expression "within an interior of" the vehicle may refer to "inside" the vehicle, "positioned within an interior of" the vehicle, "within an interior of and further within a proximity of a driver's seat of" the vehicle, "not outside" the vehicle, and/or to "within" the vehicle, and means that the operator has gained access to a part of the vehicle whereby the outer surface of the vehicle does not constitute a barrier to signals being transmitted between the device(s) emitting the vehicle signal and the sensor(s) associated with the key device. The vehicle—which for instance may be represented by a still-standing and/or parked vehicle—may refer to any arbitrary manned or unmanned vehicle, for instance an engine-propelled or electrically-powered vehicle such as a car, truck, lorry, van, bus, aircraft, aeroplane, drone, vessel, boat etc., or a rail-bound vehicle such as, e.g., a train or tram. The vehicle is adapted to support a passive start of driving means thereof such as an engine, initiated by a key device associated therewith over, e.g., a secure communication link, as commonly known in the art. Moreover, the vehicle may optionally be adapted to support an unlocking of an electronic lock of one or more doors, trunk and/or storage compartment thereof, initiated by said key device, as commonly known in the art.

Since the within-vehicle-confirming system determines that there is a secure communication link between the vehicle and the key device, it is established that the vehicle and key device are wirelessly connected and may communicate in a trusted manner, blocking out the possibility of eavesdropping. Subsequently, the key device may be utilized for potentially opening—i.e., allowing access to one or more parts of the vehicle—and furthermore potentially starting the vehicle, i.e., initiating the vehicle's engine or drive means so that the vehicle can be moved. The secure communication link may be accomplished as commonly known in the art, for instance via Bluetooth or via an equivalent or successor thereof, or via any arbitrary short-range protocol. "Secure" communication link may refer to "authenticated" communication link and/or "encrypted and authenticated" communication link. "Determining that there is" a secure communication link may refer to "determining that there is established" a secure communication link, and further to "determining", "initiating" and/or "establishing" a secure communication link. Moreover, "between said vehicle and said key device" may refer to "between said vehicle, a control unit associated therewith and/or said within-vehicle-confirming system and said key device".

Since the within-vehicle-confirming system provides a vehicle sound signal within the interior of the vehicle, there is emitted—e.g., by means of a loudspeaker or any other sound emitting or transmitting device(s)—a signal of sound inside the vehicle, thus detectable therein. Thereby, unlike short-wavelength signals such as, e.g., Bluetooth and/or Wi-Fi signals, which—should they be emitted within the vehicle—would extend outside and/or beyond the chassis of the vehicle, sound signals—with their longer wavelengths—are to a greater extent limited to a range within the vehicle. The characteristics of the vehicle sound signal may be arbitrarily selected, for instance the vehicle sound signal may comprise a combination of audible or inaudible tones, and/or a short jingle or melody. Moreover, the volume and/or amplitude of the vehicle sound signal may be arbitrarily selected in view of the implementation at hand, for instance such that it may be detectable and/or considered detectable within the vehicle and not outside the vehicle. The vehicle signal—and/or a signature thereof—may last an arbitrary duration of time, for instance from a few milliseconds up to several seconds or longer. "Providing" a vehicle sound signal may refer to "transmitting" and/or "emitting" a vehicle sound signal, whereas "vehicle sound signal" may refer to "sound signal". Moreover, vehicle sound "signal" may refer to vehicle sound "pattern, sequence, wave and/or stimulus", whereas "sound signal" may refer to "challenge signal encoded as sound", "challenge encoded as sound and/or ultrasound", "challenge signal", "challenge sound signal", "passive-start challenge", "series of tones", "bit-stream encoded and/or modulated into sound" and/or "challenge data encoded and/or modulated into sound". The expression "within said interior" of the vehicle may refer to "within at least a portion of said interior" oft the vehicle and/or "within said interior and within a proximity of a driver's seat" of the vehicle. Furthermore, "providing a vehicle signal within said interior of the vehicle" may refer to "providing a vehicle signal within said interior of the vehicle, with support from one or mode loudspeakers and/or tone generators associated with, comprised in, within and/or of said vehicle".

Since the within-vehicle-confirming system receives—from the key device—a key device signal via the secure communication link, which key device signal is derived from a sound signal detected by one or more sensors associated with the key device, there is derived in a trusted manner from the key device a signal which is based on a signal of sound detected by at least a first sensor such as a microphone of the key device. The sound signal detected by the key device and subsequently the corresponding key device signal—and/or signatures thereof—may last an arbitrary duration of time, for instance from a few milliseconds up to several seconds or longer. "Receiving" may refer to "deriving", whereas "via" the secure communication link may refer to "over" the secure communication link. Moreover, key device "signal" may refer to key device "pattern, sequence, wave and/or stimulus", whereas "signal" further may refer to "challenge response signal" and/or "challenge response". "Key device signal" may refer to "challenge response signal". Moreover, the key device signal being "derived from" a sound signal may refer to the key device signal being "based on, sampled from, demodulated from, reflecting and/or corresponding to" a sound signal. Sound "signal" may refer to sound "pattern, sequence, wave and/or stimulus", whereas "sound signal" may refer to "series of tones", "combination of tones", "bitstream encoded and/or modulated into sound" and/or "challenge data encoded and/or modulated into sound". Moreover, "detected" by one or more sensors may refer to "sensed and/or sampled" by one or more sensors. Furthermore, "one or more sensors" associated with the key device may refer to "one or more sound sensors such as microphones, and/or equivalents thereof" associated with the key device, whereas "associated with" the key device may refer to "of and/or comprised in" the key device.

According to an example, the action described above of providing the vehicle sound signal within the vehicle may be preceded by the action:

providing to said key device—via said secure communication link—information pertaining to said vehicle sound signal.

Thereby, the information provided may simplify the key device's analysis of the sound signal. The information may for instance comprise an indication of frequencies that may be used to modulate the vehicle sound signal and/or an indication of a carrier frequency around which modulation of the sound signal may occur. "Pertaining to" may refer to "associated with" and/or "specifying characteristics of".

According to another example, the action described above of receiving the key device signal, may be preceded by the actions:

detecting—by means of one or more sensors associated with said key device—a sound signal; and determining—by means of said key device—a key device signal, said key device signal being derived from said sound signal detected by the one or more sensors associated with said key device.

Since the within-vehicle-confirming system compares the vehicle sound signal with the key device signal, similarities and/or correlations between the vehicle sound signal provided within the vehicle, e.g., by means of a loudspeaker and the key device signal—subsequently the sound signal detected by the key device sensor(s) such as a microphone—are analyzed. "Comparing" may refer to "analyzing one or more similarities and/or correlations between", whereas "comparing said vehicle sound signal with said key device signal" may refer to "comparing a signature and/or one or more characteristics of said vehicle sound signal with a signature and/or characteristics of said key device signal". Said "signature" may refer to "time domain envelope", "time domain" and/or "frequency spectrum". According to an example, the expression "comparing said vehicle sound signal with said key device signal" may comprise "comparing said vehicle sound signal with said key device signal, wherein when said key device signal matches said vehicle sound signal, it is determined that said key devise is within said vehicle". According to another example, the expression "comparing said vehicle sound signal with said key device signal" may comprise "comparing said vehicle sound signal with said key device signal, wherein when said key device signal matches said vehicle sound signal, it is determined that said one or more key device sensors has detected said vehicle sound signal provided within the vehicle". "When" may refer to "if" and/or "provided that".

Since the within-vehicle-confirming system enables a start of the vehicle when the key device signal matches the vehicle sound signal, i.e., when the within-vehicle-confirming system determines that the key device signal detected by the key device corresponds to the vehicle sound signal that was emitted by the within-vehicle-confirming system, start of the vehicle is enabled only if the key device signal is determined to correspond to the vehicle sound signal. Subsequently, a start of the vehicle is enabled only if the sound signal detected by the key device sensor(s) is considered to match the sound signal provided within the vehicle, which implies that the key device sensor(s) has detected the vehicle sound signal. This in turn implies that the key device is within the interior of the vehicle, rather than outside the vehicle. Accordingly, a start of the vehicle is enabled only when the key device is within the vehicle, which thus reduces the risk of accidentally enabling start of the vehicle while the key device is outside the vehicle. "Enabling" a start may refer to "initiating", "allowing" and/or "activating" a start. Moreover, enabling a "start" of the vehicle may refer to enabling a "start of driving means and/or an engine" of the vehicle. According to an example, the expression "enabling a start of said vehicle" may refer to "enabling said passive start". The actual subsequent potential start of the vehicle may be accomplished as commonly known in the art, for instance with support from a vehicle start control system and/or by means of for instance a push of a start button by an operator such as the driver. The expression "when said key device signal matches said vehicle sound signal" may refer to "when a signature of and/or characteristics of said key device signal matches a signature and/or characteristics of said vehicle sound signal". "When" may refer to "if" and/or "provided that", whereas "matches" throughout may refer to "essentially matches", "to a predetermined extent matches", "correlates with" and/or "coincides with".

Optionally, the within-vehicle determining system may determine that a driving means for the vehicle is inactive. The within-vehicle determining system may then further determine with support from one or more sensors associated with the vehicle, that an operator is deemed to be entering—and/or has entered—the vehicle. Thereby, following upon establishing that the vehicle's driving means is not running, there is then further established that an operator such as a driver or potential driver is likely to be entering and/or likely to have already entered the vehicle. Accordingly, subsequent an inactive state of the vehicle, said operator is assumed to be—or within shortly to be—within the interior of the vehicle. "Determining" that a vehicle's driving means is inactive may refer to "confirming" and/or "deriving—e.g., via a vehicle communication bus—information regarding" that a vehicle's driving means is inactive. Moreover, "inactive" may refer to "not running", whereas "driving means" may refer to "engine". "Has entered" may refer to "be within". The expression "determining" with support from one or more sensors may refer to "detecting", "deriving from" and/or "detecting by means of" one or more sensors. Furthermore, "sensors" may in this context refer to "vehicle sensors", whereas sensors "associated" with the vehicle may refer to "at least partly comprised in and/or provided in or on" the vehicle. One or more "sensors" may refer to one or more "vehicle door opening/closing status sensors, vehicle door handle touch sensors, vehicle interior and/or exterior vision sensors such as cameras, vehicle sound sensors such as microphones, vehicle seat weight sensors, vehicle touch sensors, e.g., positioned on the vehicle's steering wheel and/or gear shift". One or more of the one or more sensors may further optionally be positioned essentially on the driver's side of the vehicle. Furthermore, "operator" may refer to "driver" and/or "potential driver" and/or any party that is authorized to access and/or move the vehicle, and may further potentially imply the person in possession of and/or carrying the key device. The expression "is deemed to" may refer to "is assumed to" and/or "is established to". According to an example, the expression "determining [ . . . ], that an operator is deemed to be entering—and/or has entered—said vehicle" may refer to "determining [ . . . ], that a door such as a driver's side door has been opened and optionally closed again, that a door handle such as a driver's door handle has been touched and/or activated, that one or more images has been captured of a person being within said vehicle, e.g., in a driver's seat, that sound such as human sound has been captured within the vehicle indicating presence of a person, e.g., in proximity of a driver's seat, that a sufficient weight indicating a person has been detected in a seat of said vehicle such as the driver's seat, and/or that a person's touch has been captured on a steering wheel and/or a gear shift of said vehicle". The sensors discussed above refer to sensors commonly known and utilized in the art.

Optionally, the one or more sensors associated with the vehicle may comprise one or more door status sensors adapted to detect opening and closing of a door of the vehicle. The determining discussed above that an operator is deemed to be entering—and/or has entered—the vehicle, may then further comprise determining with support from the one or more door status sensors, that a door of the vehicle has been opened and subsequently closed. Thereby, in addition to the ability to potentially establish that an operator is deemed to be within the vehicle, by closing of the vehicle door the interior of the vehicle is closed off from an exterior thereof. Accordingly, the vehicle sound signal provided within the vehicle may to a greater extent be detected only inside the vehicle, not reaching outside thereof. Detection of opening and subsequent closing of a vehicle door may be accomplished as commonly known in the art. Moreover, "door status sensors" may refer to "driver's side door sensors", whereas "door" may refer to "driver's side door".

Optionally, the vehicle sound signal may comprise an audio signal—i.e., a signal with a frequency in the audio frequency range of about 20 to 20,000 Hz thus the limits of human hearing—and/or an ultrasound signal—i.e., a signal with a frequency higher than the upper audible limit of human hearing which is approximately 20,000 Hz. Additionally or alternatively, the sound signal detected by the key device may comprise an audio signal and/or an ultrasound signal. Thereby, the vehicle sound signal is represented by a signal of relatively long wave-length as compared to short-wavelength signals such as Bluetooth and/or Wi-Fi signals, thus to a greater extent limiting the range of the vehicle sound signal to an interior of the vehicle. Furthermore, thereby, the sound signal detected by the key device is represented by a sound which may be detected by the key device in a convenient manner, e.g., by means of one or more microphones, which commonly is provided in known key devices such as smart phones.

Optionally, the providing of the vehicle sound signal within the vehicle discussed above may comprise providing a randomly generated vehicle sound signal within the vehicle. Thereby, a risk of a successful malicious attempt to enable start of the vehicle by, e.g., an illicit key device and/or equipment, may be decreased, in that the vehicle sound signal may be difficult if not impossible to predict. Randomization of the vehicle sound signal may be accomplished as commonly known in the art.

Optionally, the providing of the vehicle sound signal within the vehicle discussed above may comprise providing a vehicle sound signal within the vehicle, which vehicle sound signal has a duration greater than a predetermined minimum threshold. Thereby, a sound signal of significant duration may be emitted, thus providing for the duration of the vehicle sound signal to be extensive enough for the subsequent comparison between the vehicle sound signal and the key device signal derived from the sound signal detected by the key device, to be sufficient. The minimum threshold may be adjustable, and may further be arbitrarily set, e.g., as considered suitable for the implementation at hand, for instance be greater than 10 ms, 100 ms or 1 s. The expression "predetermined minimum threshold" may refer to "minimum threshold", and further to "predetermined minimum duration and/or time threshold".

Optionally, the comparing the vehicle sound signal with the key device signal discussed above may comprise comparing a time signature and/or frequency domain signature of the vehicle sound signal with a time signature and/or frequency domain signature of the key device signal. The enabling a start of the vehicle discussed above may then comprise enabling a start of the vehicle when the time signature and/or frequency domain signature of the key device signal matches the time signature and/or frequency domain signature of the vehicle sound signal. Thereby, similarities and/or correlations may be established between the two signals, in view of time signatures and/or frequency domain signatures of said signals. "Matches" may as previously indicated refer to "essentially matches", "to a predetermined extent matches", "correlates with" and/or "coincides with".

According to a second aspect of embodiments herein, the object is achieved by a within-vehicle-confirming system adapted to be on-board a vehicle, which within-vehicle-confirming system is adapted for, prior to enabling an operator in possession of a key device to initiate a passive start of the vehicle, establishing that the key device is within an interior of the vehicle. The within-vehicle-confirming system comprises a communication determining unit adapted for determining that there is a secure communication link between the vehicle and the key device. The within-vehicle-confirming system further comprises a sound providing unit adapted for providing a vehicle sound signal within the interior of the vehicle. Moreover, the within-vehicle-confirming system comprises a signal receiving unit adapted for receiving from the key device a key device signal via the secure communication link, which key device signal is derived from a sound signal detected by one or more sensors associated with the key device. Furthermore, the within-vehicle-confirming system comprises a comparing unit adapted for comparing the vehicle sound signal with the key device signal. The within-vehicle-confirming system further comprises an enabling unit adapted for enabling a start of the vehicle when the key device signal matches the vehicle sound signal.

According to an example, the sound providing unit may further be adapted for:

providing to said key device—via said secure communication link—information pertaining to said vehicle sound signal.

According to another example, the key device may be adapted for:

detecting—by means of one or more sensors associated with said key device—a sound signal; and determining—by means of said key device—a key device signal, said key device signal being derived from said sound signal detected by the one or more sensors associated with said key device.

Optionally, the within-vehicle-confirming system may further comprise an inactivity determining unit adapted for determining that a driving means of the vehicle is inactive. The within-vehicle-confirming system then further comprises an entry determining unit adapted for determining with support from one or more sensors associated with the vehicle, that an operator is deemed to be entering—and/or has entered—the vehicle.

Optionally, the one or more sensors associated with the vehicle may comprise one or more door status sensors adapted to detect opening and closing of a door of the vehicle. The entry determining unit may then further be adapted for determining with support from the one or more door status sensors, that a door of the vehicle has been opened and subsequently closed.

Optionally, the vehicle sound signal may comprise an audio signal and/or an ultrasound signal. Additionally or alternatively, the sound signal detected by the key device may comprise an audio signal and/or an ultrasound signal.

Optionally, the sound providing unit may be adapted for providing a randomly generated vehicle sound signal within the vehicle.

Optionally, the sound providing unit may be adapted for providing a vehicle sound signal within the vehicle, which vehicle sound signal has a duration greater than a predetermined minimum threshold.

Optionally, the comparing unit may be adapted for comparing a time signature and/or frequency domain signature of the vehicle sound signal with a time signature and/or frequency domain signature of the key device signal. The enabling unit is then adapted for enabling a start of the vehicle when the time signature and/or frequency domain signature of the key device signal matches the time signature and/or frequency domain signature of the vehicle sound signal.

Similar advantages as those mentioned in the foregoing in relation to the first aspect correspondingly apply to the second aspect, which is why these advantages are not further discussed.

According to a third aspect of embodiments herein, the object is achieved by a vehicle comprising at least a portion of a within-vehicle-confirming system as discussed above, for instance comprising the communication determining unit, the optional inactivity determining unit, the optional entry determining unit, the sound providing unit, the signal receiving unit, the comparing unit and/or the enabling unit. Again, similar advantages as those mentioned in the foregoing as those mentioned in the foregoing correspondingly apply to the third aspect, which is why these advantages are not further discussed.

According to a fourth aspect of embodiments herein, the object is achieved by:

a computer program product comprising a computer program containing computer program code means arranged to cause a computer or a processor to execute the steps of the within-vehicle-confirming system discussed above, stored on a computer-readable medium or a carrier wave.

Yet again, similar advantages as those mentioned in the foregoing in relation to the first aspect correspondingly apply to the fourth aspect, which is why these advantages are not further discussed.

BRIEF DESCRIPTION OF THE DRAWINGS

The various aspects of the non-limiting embodiments of the disclosure, including particular features and advantages, will be readily understood from the following detailed description and the accompanying drawings.

DETAILED DESCRIPTION

Figure 1:
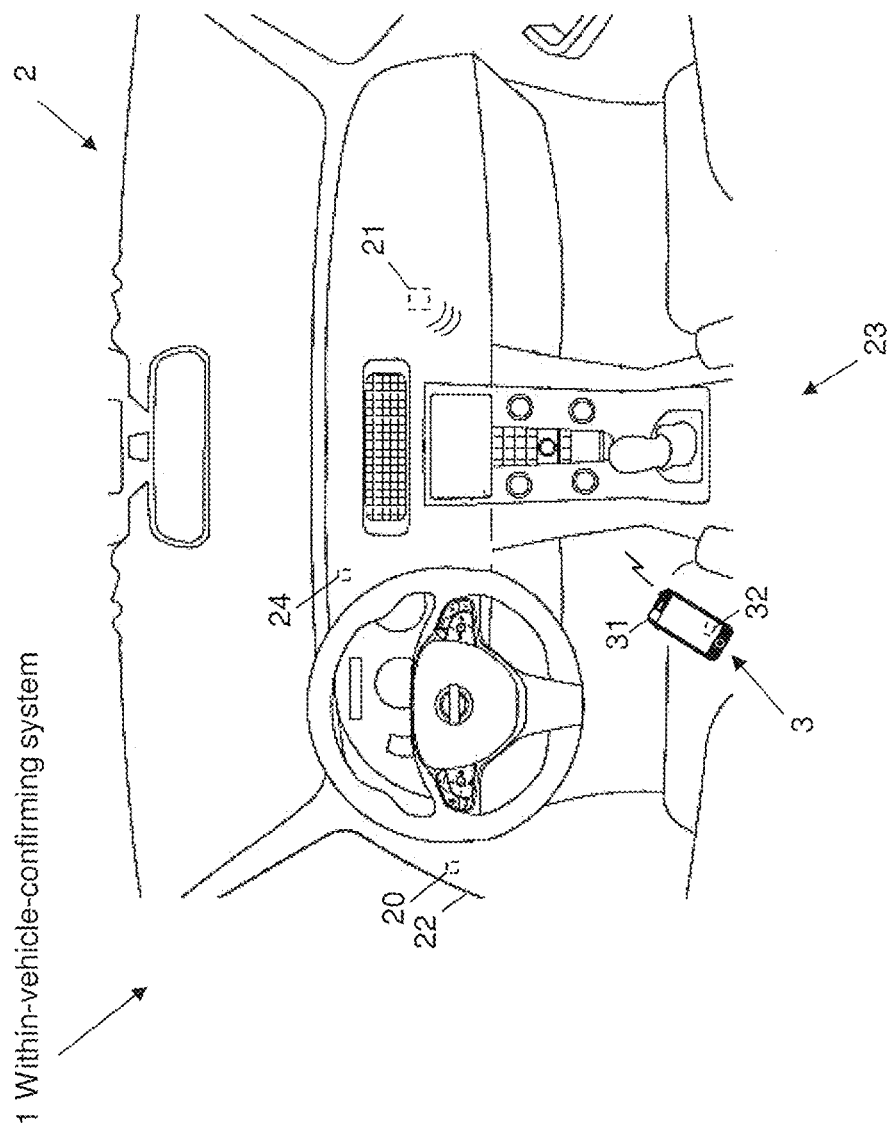
FIG. 1 illustrates a schematic overview of an exemplifying within-vehicle-determining system according to embodiments of the disclosure.

The non-limiting embodiments of the present disclosure will now be described more fully hereinafter with reference to the accompanying drawings, in which currently preferred embodiments of the disclosure are shown. This disclosure may, however, be embodied in many different forms and should not be construed as limited to the embodiments set forth herein Like reference characters refer to like elements throughout. Dashed lines of some boxes in the figures indicate that these units or actions are optional and not mandatory.

In the following, according to embodiments herein which relate to—prior to enabling an operator in possession of a key device to initiate a passive start of a vehicle—establishing that the key device is within an interior of the vehicle, there will be disclosed an approach according to which a passive start may be avoided should the key device be outside rather than inside the vehicle.

Referring now to the figures and FIG. 1 in particular, there is illustrated a schematic overview of an exemplifying within-vehicle-determining system 1 according to embodiments of the disclosure. The within-vehicle-determining system 1 is at least partly positioned on-board—and/or comprised in—a vehicle 2, which vehicle 2 here is represented by a passenger car. The vehicle 2 here comprises optional one or more sensors 20 associated with the vehicle 2, and further an optional loudspeaker 21. The one or more optional sensors 20 associated with the vehicle 2 are here represented by one or more door status sensors comprised in a door 22 of the vehicle 2, here the door on the driver's side of the vehicle 2. The one or more door status sensors are adapted to detect opening and closing of the door 22. An interior of the vehicle 2 is here denoted 23. Also depicted is an optional vehicle start control 24, here comprising a start button.

The within-vehicle-confirming system 1 is adapted for—prior to enabling an operator in possession of a key device 3 to initiate a passive start of a vehicle 2—establishing that the key device 3 is within an interior 23 of the vehicle 2. The key device 3 is here represented by a smart phone. One or more sensors associated with the key device 3 are here denoted 31, and are further here represented by a microphone comprised in the key device 3. It may be noted that although not depicted in FIG. 1, the key device 3 may be carried by an operator, e.g., be positioned in the operator's pocket, hand, bag and/or purse etc. Additionally or alternatively, rather than be positioned on the operator's person, the key device 3 may after vehicle entry be positioned in any arbitrary location within the vehicle 2, e.g., in a cradle, in a center console of the vehicle 2, and/or, e.g., in a bag or purse. The key device 3 may comprise an optional app 32 which may assist an operator in a commonly known manner to communicate over a secure communication link—such as via Bluetooth—with the vehicle 2.

Figure 2:
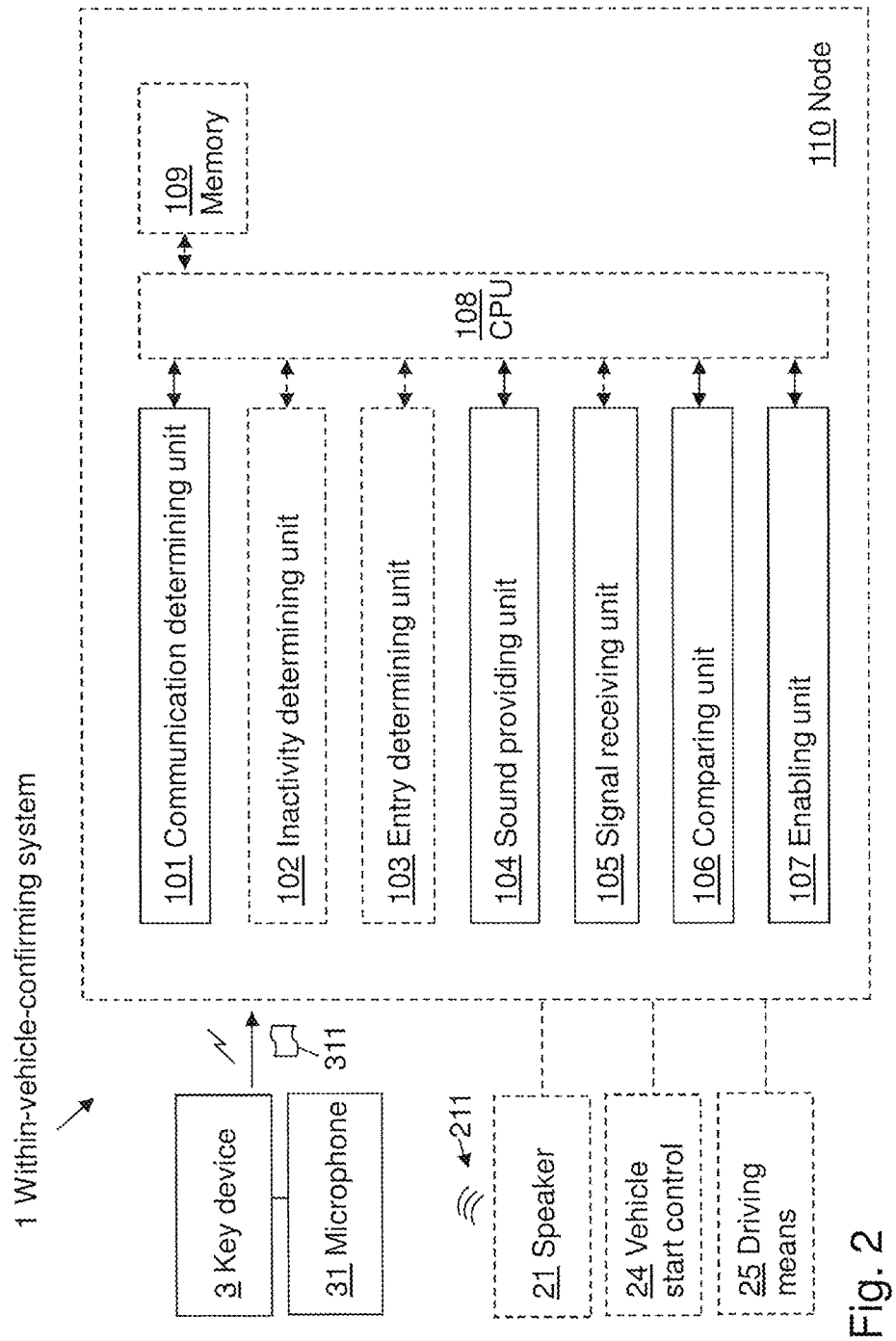
FIG. 2 is a schematic block diagram illustrating an exemplifying within-vehicle-determining system according to embodiments of the disclosure.
Figure 3:
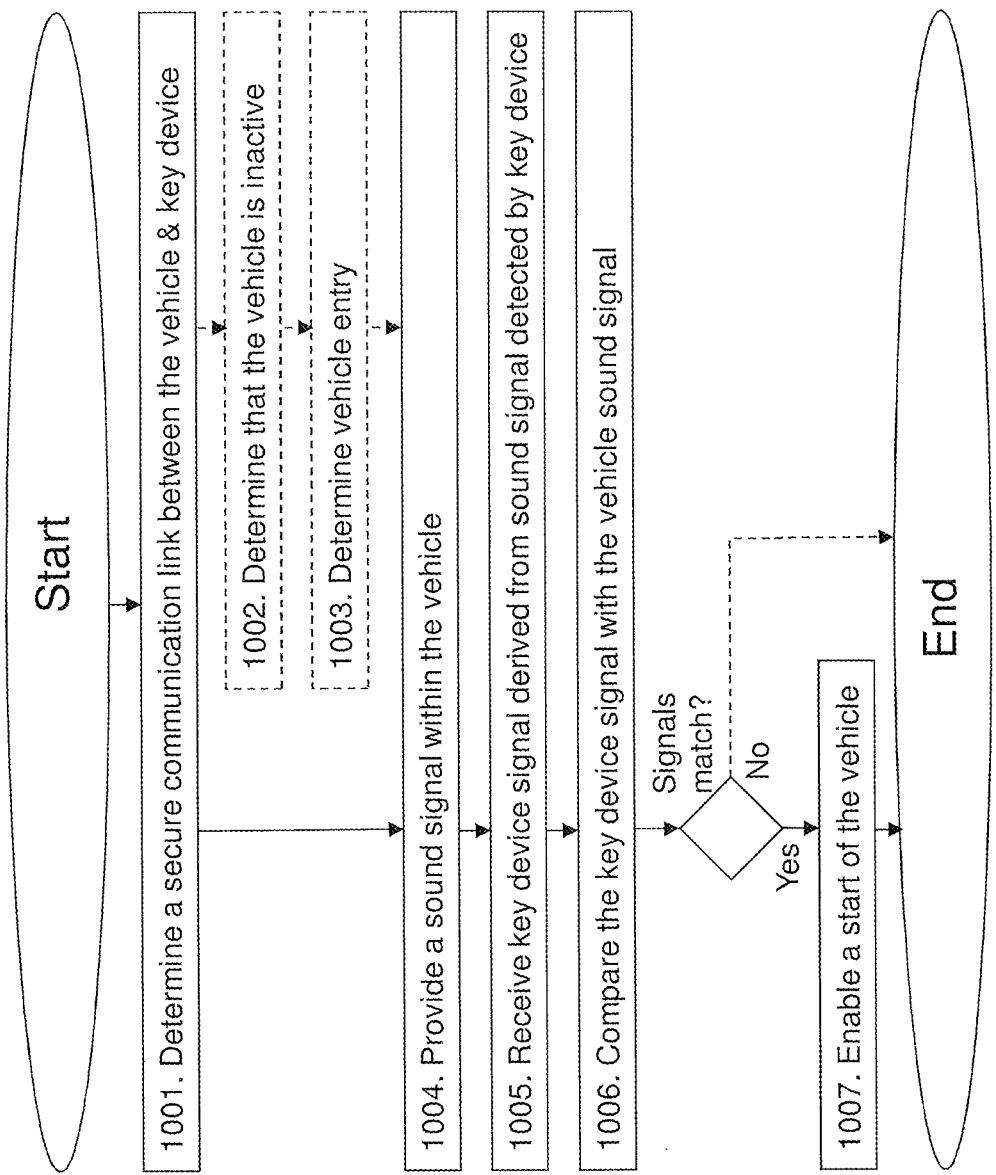
FIG. 3 is a flowchart depicting an exemplifying method according to embodiments of the disclosure, for—prior to enabling an operator in possession of a key device to initiate a passive start of a vehicle—establishing that the key device is within an interior of the vehicle.

As further shown in FIG. 2, which depicts a schematic block diagram illustrating an exemplifying within-vehicle-determining system 1 according to embodiments of the disclosure, the within-vehicle-determining system 1 comprises a communication determining unit 101, an optional inactivity determining unit 102, an optional entry determining unit 103, a sound providing unit 104, a signal receiving unit 105, a comparing unit 106 and an enabling unit 107, all of which will be described in greater detail in conjunction with FIG. 3. Furthermore, the embodiments herein for—prior to enabling an operator in possession of a key device 3 to initiate a passive start of a vehicle 2—establishing that the key device 3 is within the interior 23 of the vehicle 2, may be implemented through one or more processors, such as a processor 108, here denoted CPU, together with computer program code for performing the functions and actions of the embodiments herein. Said program code may also be provided as a computer program product, for instance in the form of a data carrier carrying computer program code for performing the embodiments herein when being loaded into the within-vehicle-determining system 1. One such carrier may be in the form of a CD ROM disc. It is however feasible with other data carriers such as a memory stick, flash memory, etc. The computer program code may furthermore be provided as pure program code on a server and downloaded to the within-vehicle-determining system 1. The within-vehicle-determining system 1 may further comprise a memory 109 comprising one or more memory units. The memory 109 may be arranged to be used to store, e.g., information, and further to store data, configurations, schedulings, and applications, to perform the methods herein when being executed in the within-vehicle-determining system 1. For instance, the computer program code may be implemented in the firmware, stored in FLASH memory 109, of an embedded processor 108.

Furthermore, the communication determining unit 101, the optional inactivity determining unit 102, the optional entry determining unit 103, the sound providing unit 104, the signal receiving unit 105, the comparing unit 106, the enabling unit 107, the optional processor 108 and/or the optional memory 109 may at least partly be comprised in the vehicle 2—for instance in one or more nodes 110 thereof such as electronic control units (ECUs). Those skilled in the art will also appreciate that the communication determining unit 101, the optional inactivity determining unit 102, the optional entry determining unit 103, the sound providing unit 104, the signal receiving unit 105, the comparing unit 106 and/or the enabling unit 107 described above, and which will be described in more detail later on in this description, may refer to a combination of analog and digital circuits, and/or one or more processors configured with software and/or firmware, e.g., stored in a memory such as the memory 109, that when executed by the one or more processors such as the processor 108 perform as will be described in more detail in conjunction with FIG. 3. One or more of these processors, as well as the other digital hardware, may be included in a single ASIC (Application-Specific Integrated Circuitry), or several processors and various digital hardware may be distributed among several separate components, whether individually packaged or assembled into a SoC (System-on-a-Chip).

Further shown in FIG. 2 is an optional driving means 25 of the vehicle 2, here represented by an engine. Also shown is a vehicle sound signal 211 provided within the vehicle 2, here with support from the loudspeaker 21. Further depicted is a key device signal 311 received from the key device 3 via the secure communication link between the vehicle 2 and the key device 3. The key device signal 311 is derived from a sound signal detected by the one or more sensors 31, here microphone, associated with the key device 3. The vehicle sound signal 211 and the key device signal 311 will be further described below.

FIG. 3 is a flowchart depicting an exemplifying method according to embodiments of the disclosure for—prior to enabling an operator in possession of a key device 3 to initiate a passive start of a vehicle 2—establishing that the key device 3 is within an interior 23 of the vehicle 2. The exemplifying method, which may be continuously repeated, comprises the following actions discussed with support from essentially FIGS. 1 and 2. The actions may be taken in any suitable order, for instance may Actions 1001 and 1004 be performed simultaneously and/or in an alternate order.

Action 1001

In Action 1001, the within-vehicle-determining system 1 determines—e.g., by means of the communication determining unit 101—that there is a secure communication link between the vehicle 2 and the key device 3. Thus, as shown with support from at least FIGS. 1 and 2, it is established that the vehicle 2 and key device 3 are wirelessly connected and may communicate in a trusted manner. Subsequently, the key device 3 may be utilized for potentially opening and furthermore potentially starting the vehicle 2.

Action 1002

In optional Action 1002, the within-vehicle-determining system 1 may determine—e.g., by means of the inactivity determining unit 102—that a driving means 25 of the vehicle is inactive. Thus, as shown with support from at least FIGS. 1 and 2, it may established that the vehicle's driving means 25, here engine, is not running.

Action 1003

In optional Action 1003, which follows upon optional Action 1002 of determining that the driving means 25 is inactive, the within-vehicle-determining system 1 may determine—e.g., by means of the entry determining unit 102—with support from one or more sensors 20 associated with the vehicle 2, that an operator is deemed to be entering—and/or has entered—the vehicle 2. Thus, as shown with support from at least FIGS. 1 and 2, it may be established that an operator such as a driver or potential driver is likely to be entering and/or likely to have already entered the vehicle 2. Accordingly, subsequent an inactive state of the vehicle 2, said operator is in this scenario assumed to be—or within shortly be—within the interior 23 of the vehicle 2.

Optionally, the one or more sensors 20 associated with the vehicle 20 may comprise one or more door status sensors adapted to detect opening and closing of a door 22 of the vehicle 2, as shown in FIG. 1. Action 1003 of determining that an operator is deemed to be entering—and/or has entered—the vehicle 2, may then further comprise determining—e.g., by means of the entry determining unit 102—with support from the one or more door status sensors 20, that a door 22 of the vehicle 2 has been opened and subsequently closed. Thus, as shown with support from at least FIGS. 1 and 2, in addition to the ability to potentially establish that an operator is deemed to be within the vehicle 2, by closing of the vehicle door 22 the interior 23 of the vehicle 2 is closed off from an exterior thereof. Accordingly, the vehicle sound signal 211 subsequently provided (Action 1004 below) within the vehicle 2 may to a greater extent be detected only inside the vehicle 2, not reaching outside thereof.

Action 1004

In Action 1004, the within-vehicle-determining system 1 provides—e.g., by means of the sound providing unit 104—a vehicle sound signal 211 within the interior 23 of the vehicle 2. Thus, as shown with support from at least FIGS. 1 and 2, there is emitted—here by means of a loudspeaker 21—a signal 211 of sound inside the vehicle 2, thus detectable therein 23. Thereby, unlike short-wavelength signals such as, e.g., Bluetooth and/or Wi-Fi signals, which—should they be emitted within the vehicle 2—would extend outside and/or beyond the chassis of the vehicle 2, sound signals 211—with their longer wavelengths—are to a greater extent limited to a range within 23 the vehicle 2.

Optionally, the vehicle sound signal 211 may comprise an audio signal and/or an ultrasound signal. Thus, as shown with support from FIGS. 1 and 2, the vehicle sound signal 211 is represented by a signal 211 of relatively long wavelength as compared to short-wavelength signals such as Bluetooth and/or Wi-Fi signals, thus to a greater extent limiting the range of the vehicle sound signal 211 to an interior 23 of the vehicle 2. Furthermore, thus, the sound signal detected by the key device 3 is represented by a sound which may be detected by the key device 3 in a convenient manner, such as by the microphone 31.

Optionally, the Action 1004 of providing a vehicle sound signal 211 within the interior 23 of the vehicle 2 may comprise providing—e.g., by means of the sound providing unit 104—a randomly generated vehicle sound signal 211 within the vehicle 2. Thus, as shown with support from FIGS. 1 and 2, a risk of a successful malicious attempt to enable start of the vehicle 2 by, e.g., an illicit key device and/or equipment, may be decreased, in that the vehicle sound signal 211 may be difficult if not impossible to predict.

Optionally, the Action 1004 of providing a vehicle sound signal 211 within the interior 23 of the vehicle 2 may comprise providing—e.g., by means of the sound providing unit 104—a vehicle sound signal 211 within the vehicle 2, which vehicle sound signal 211 has a duration greater than a predetermined minimum threshold. Thus, as shown with support from FIGS. 1 and 2, a sound signal 211 of significant duration may be emitted, thus providing for the duration of the vehicle sound signal 211 to be extensive enough for the subsequent comparison (Action 1006 below) between the vehicle sound signal 211 and the received (Action 1005 below) key device signal 311 derived from the sound signal detected by the key device 3, to be sufficient.

Action 1005

In Action 1005, the within-vehicle-determining system 1 receives—e.g., by means of the signal receiving unit 105—from the key device 3, a key device signal 311 via the secure communication link, which key device signal 311 is derived from a sound signal detected by one or more sensors 31 associated with the key device 3. Thus, as shown with support from at least FIGS. 1 and 2, there is derived in a trusted manner from the key device 3 a signal 311 which is based on a signal of sound detected by at least a first sensor 31—here a microphone—of the key device 3.

Optionally, the sound signal detected by the key device 3 may comprise an audio signal and/or an ultrasound signal. Thus, as shown with support from at least FIGS. 1 and 2, the sound signal detected by the key device 3, may be represented by a sound which may be detected by the key device 3 in a convenient manner, such as by the microphone 31.

Action 1006

In Action 1006, the within-vehicle-determining system 1 compares—e.g., by means of the comparing unit 106—the vehicle sound signal 211 with the key device signal 311. Thus, as shown with support from at least FIGS. 1 and 2, similarities and/or correlations between the vehicle sound signal 211 provided within the vehicle 2 and the key device signal 311—subsequently the sound signal detected by the key device sensor(s) 31—are analyzed.

Optionally, the Action 1001 of comparing the vehicle sound signal 211 with the key device signal 311 may comprise comparing—e.g., by means of the comparing unit 106—a time signature and/or frequency domain signature of the vehicle sound signal 211 with a time signature and/or frequency domain signature of the key device signal 311.

Action 1007

In Action 1007, the within-vehicle-determining system 1 enables—e.g., by means of the enabling unit 107—a start of the vehicle 2 when the key device signal 311 matches the vehicle sound signal 211. Thus, as shown with support from at least FIGS. 1 and 2, start of the vehicle 2 is enabled only if the key device signal 311 is determined to match the vehicle sound signal 211. Subsequently, a start of the vehicle 2 is enabled only if the sound signal detected by the key device sensor(s) 31 is considered to match the sound signal 211 provided within the vehicle 2, which implies that the key device sensor(s) 31—here microphone—has detected the vehicle sound signal 211. This in turn implies that the key device 3 is within an interior 23 of the vehicle 2, rather than outside the vehicle 2. Accordingly, a start of the vehicle 2 is enabled only when the key device 3 is within the vehicle 2, which thus reduces the risk of accidentally enabling start of the vehicle 2 while the key device 3 is outside the vehicle 2.

Enabling start of the vehicle 2 here comprises enabling start of the driving means 25 of the vehicle 2—in the shown embodiment an engine. Moreover, the actual subsequent potential start of the vehicle 2 may be accomplished as commonly known in the art, for instance with support from the vehicle start control system 24, here comprising a commonly known start button, e.g., comprised in the dashboard, steering wheel and/or gear shift.

Optionally, following upon optional Action 1006 of comparing a time signature and/or frequency domain signature of the vehicle sound signal 211 with a time signature and/or frequency domain signature of the key device signal 311, Action 1007 of enabling start of the vehicle 2 may comprise enabling—e.g., by means of the enabling unit 1007—a start of the vehicle 2 when the time signature and/or frequency domain signature of the key device signal 311 matches the time signature and/or frequency domain signature of the vehicle sound signal 211. Thus, as shown with support from at least FIGS. 1 and 2, similarities and/or correlations may be established between the two signals 211, 311, in view of time signatures and/or frequency domain signatures of the signals 211, 311.

Figure 4A:
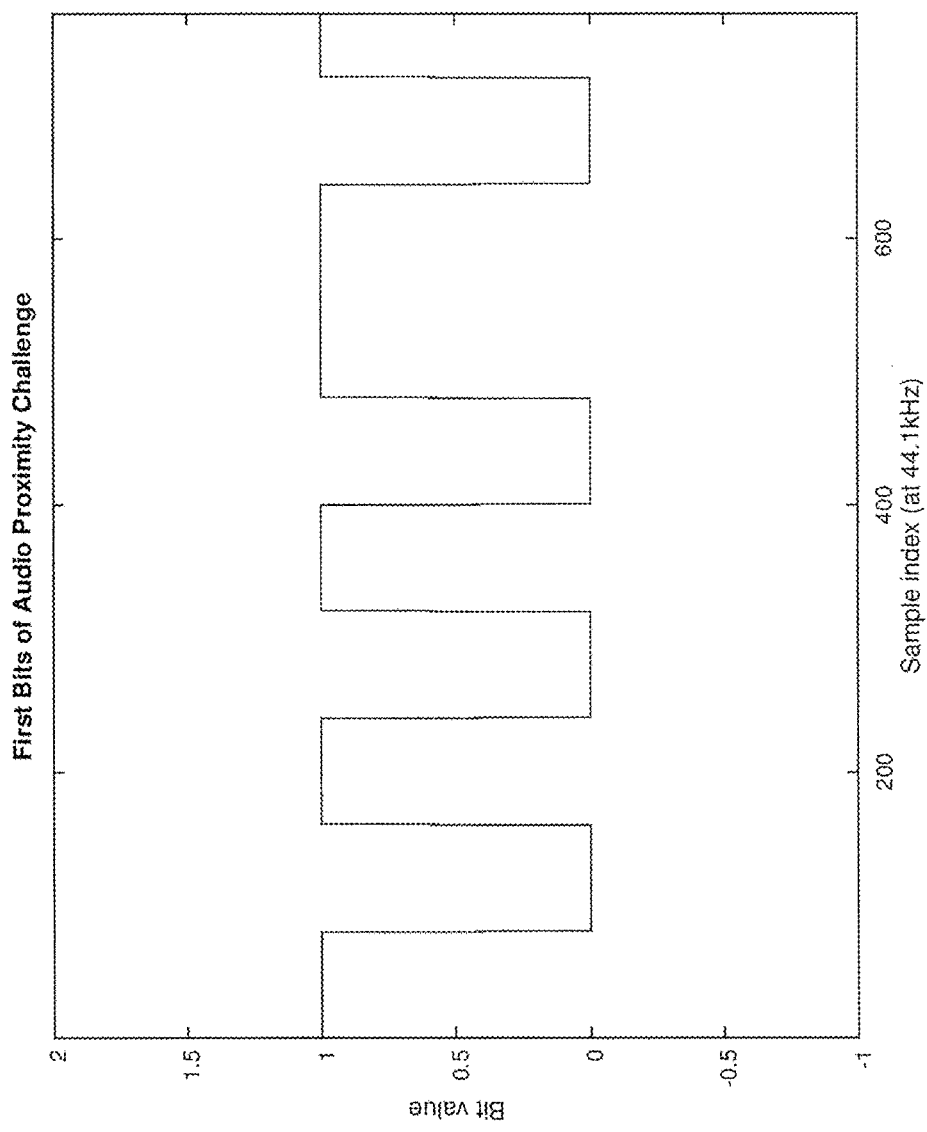
FIGS. 4A-C illustrate exemplifying diagrams according to embodiments of the disclosure.
Figure 4B:
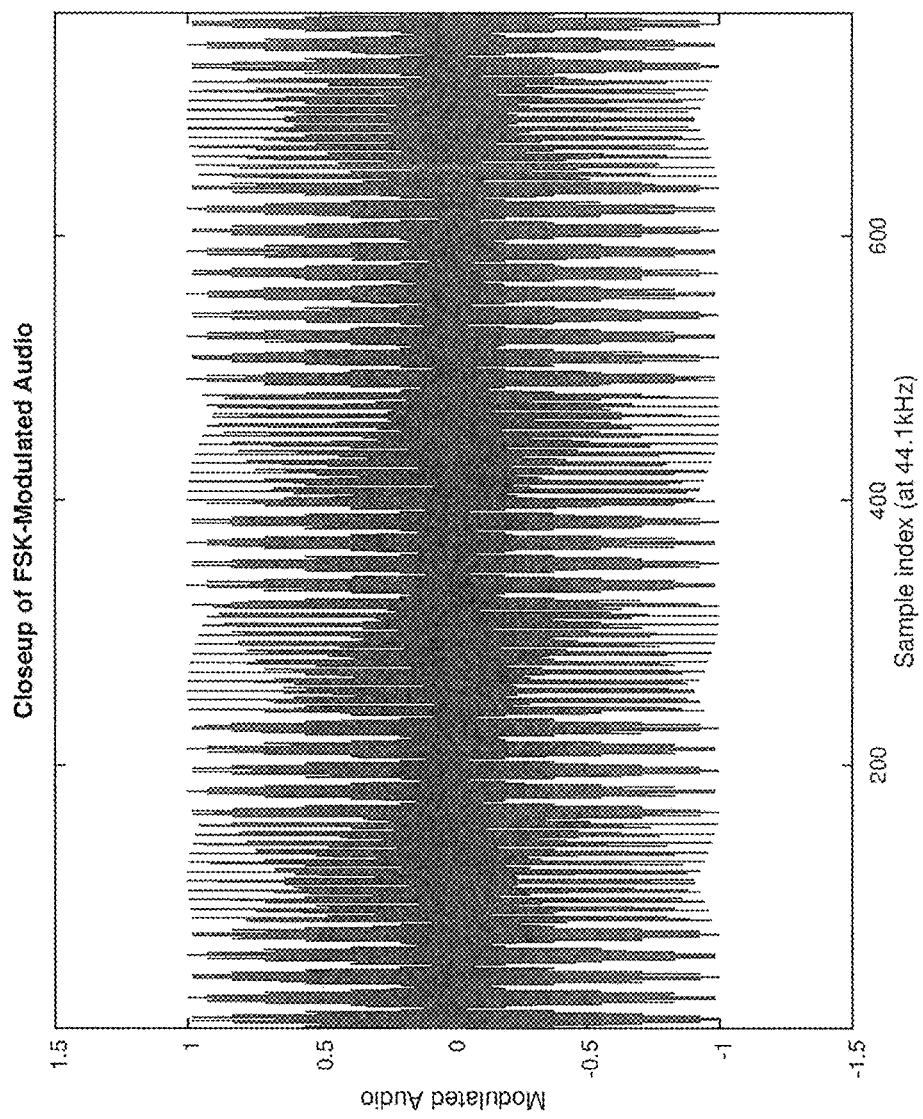
Figure 4C:
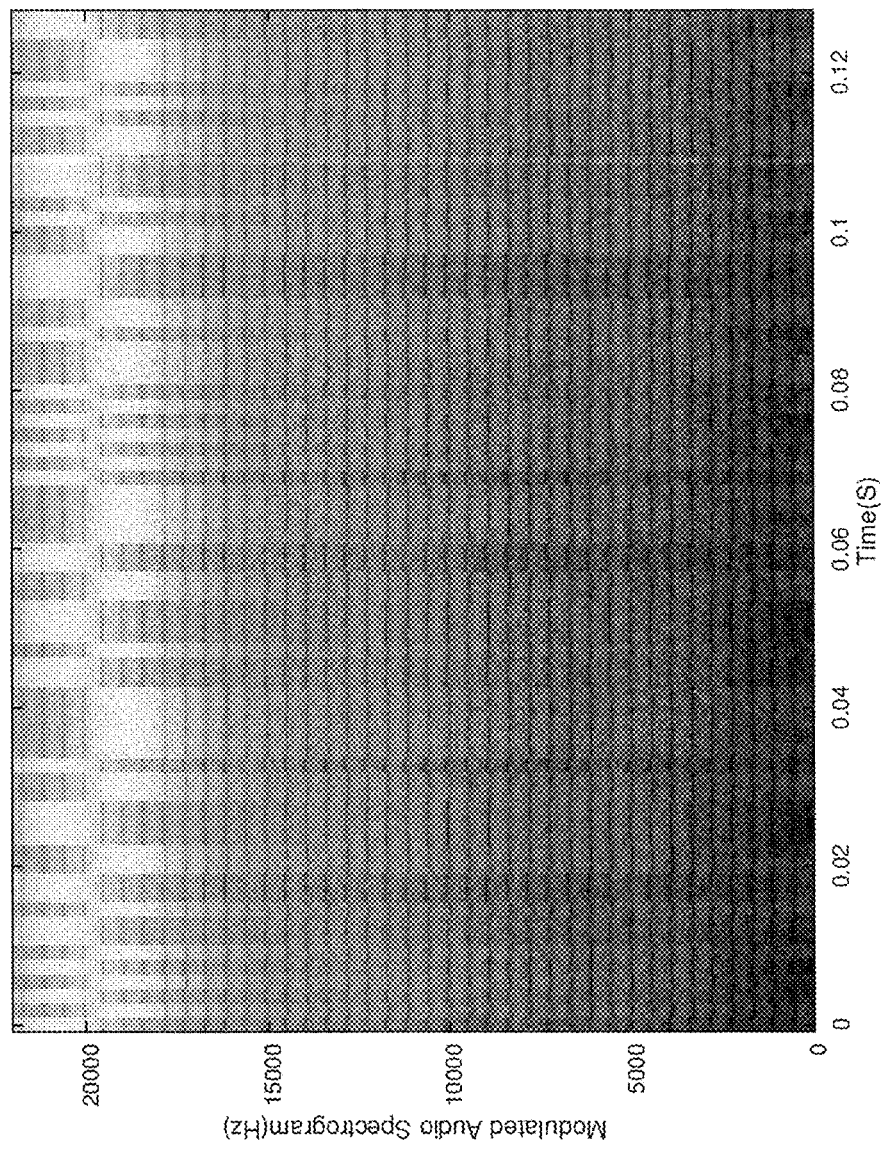

FIGS. 4A-C illustrate exemplifying diagrams according to embodiments of the disclosure. There are several ways for the vehicle 2 to send a sound signal—in FIGS. 4A-C referred to as a proximity challenge—to the key device 3, e.g., via audio. One potential method may be to allocate bits of a challenge word to specific tones, and allow the key device 3 to run analysis to determine which bits were active by detecting the tones that are present. Another, more conventional method, may be to modify the challenge's bitstream into audio or ultrasound, using Frequency Shift Keying, "FSK", or Phase Shift Keying, "PSK", the same technologies used in early modems.

In the following exemplifying illustration in FIGS. 4A-C, FSK is used to modulate the challenge bitstream into near-ultrasound frequencies which is inaudible to most people, but is detectable by the microphone 31 in the key device 3. The microphone sample rate is here 44.1 kHz, but the sample rate may alternatively be, e.g., lower or higher. It may further be noted that additionally or alternatively, PSK, QPSK, tones, or any other form of audio broadcast may be utilized for ultimately determining whether the key device 3 is in the interior 23 of the vehicle 2.

Illustrated in exemplifying FIG. 4A is a relatively slow modulating challenge bitstream, that may be utilized to modulate two frequency generators—an f0 oscillator and an f1 oscillator. In its simplest form, FSK modulates a serial bitstream into two separate frequencies, f0 and f1. Here, f0 represents a binary '0' and f1 a binary '1.' A '0' turns on the f0 oscillator and turns off the f1 oscillator, whereas a '1' turns off the f1 oscillator and turns on the f0 oscillator, as commonly known in the art.

Shown in FIG. 4B is an exemplifying bitstream-modulated audio output. The shown bitstream may be utilized to modulate into an f0 and f1 frequency, which may be output to the speaker 21 inside the vehicle 2.

Illustrated in exemplifying FIG. 4C is a spectrogram that shows the challenge inside the vehicle 2, here at frequencies mostly above the audible range for most humans, with f0 at 19 kHz representing a '0' and f1 at 20.5 kHz representing a '1'.

At the detector 31 of the key device 1, an f0 filter detects incoming signals at the f0 frequency and an f1 filter detects incoming signals at the f1 frequency. The output of these filters is combined into the decoded bitstream at the baud rate of the original modulating bitstream.

Figure 5:
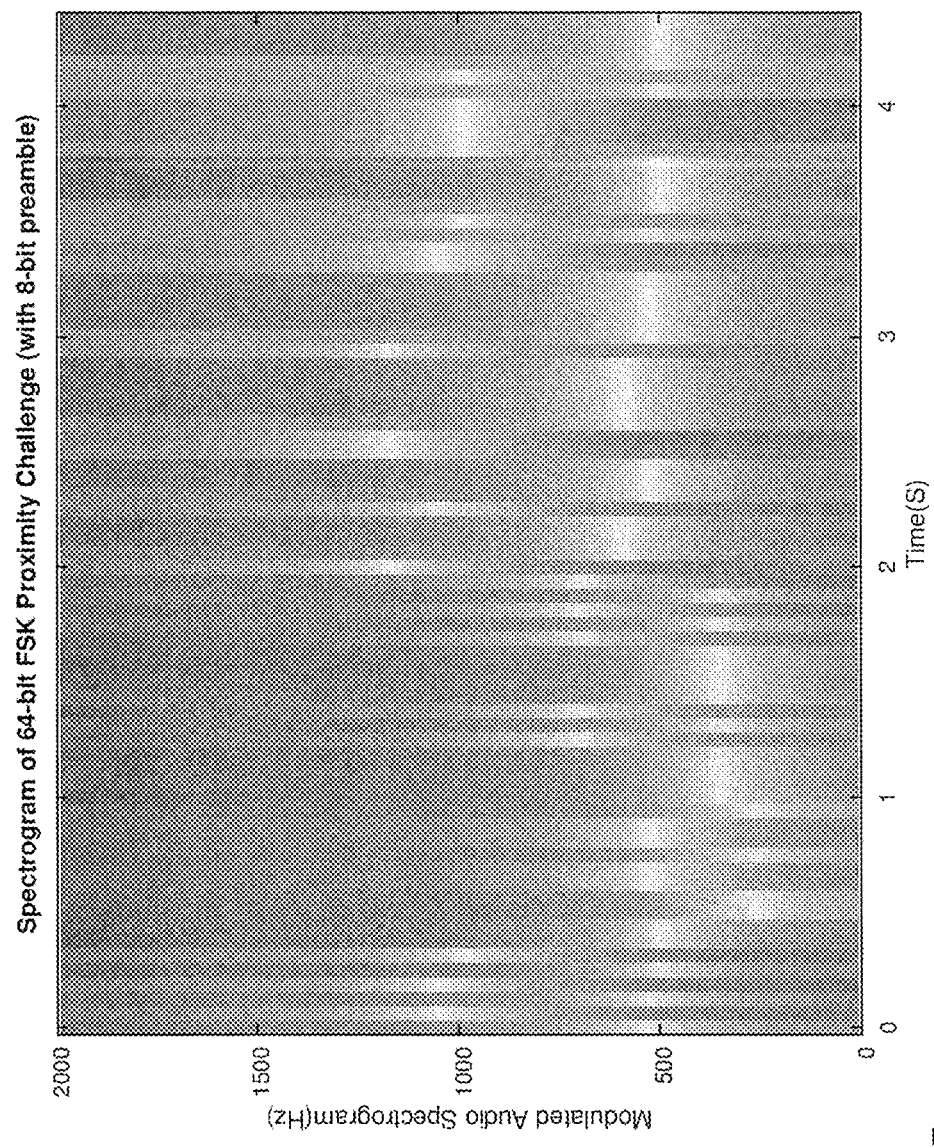
FIG. 5 illustrates an alternative exemplifying diagram according to embodiments of the disclosure.

Alternatively, FSK can also be modulated onto an audible melody, as illustrated in exemplifying FIG. 5, where the melody's notes may be chosen based on the challenge, or modulated by the FSK.

Figure 6:
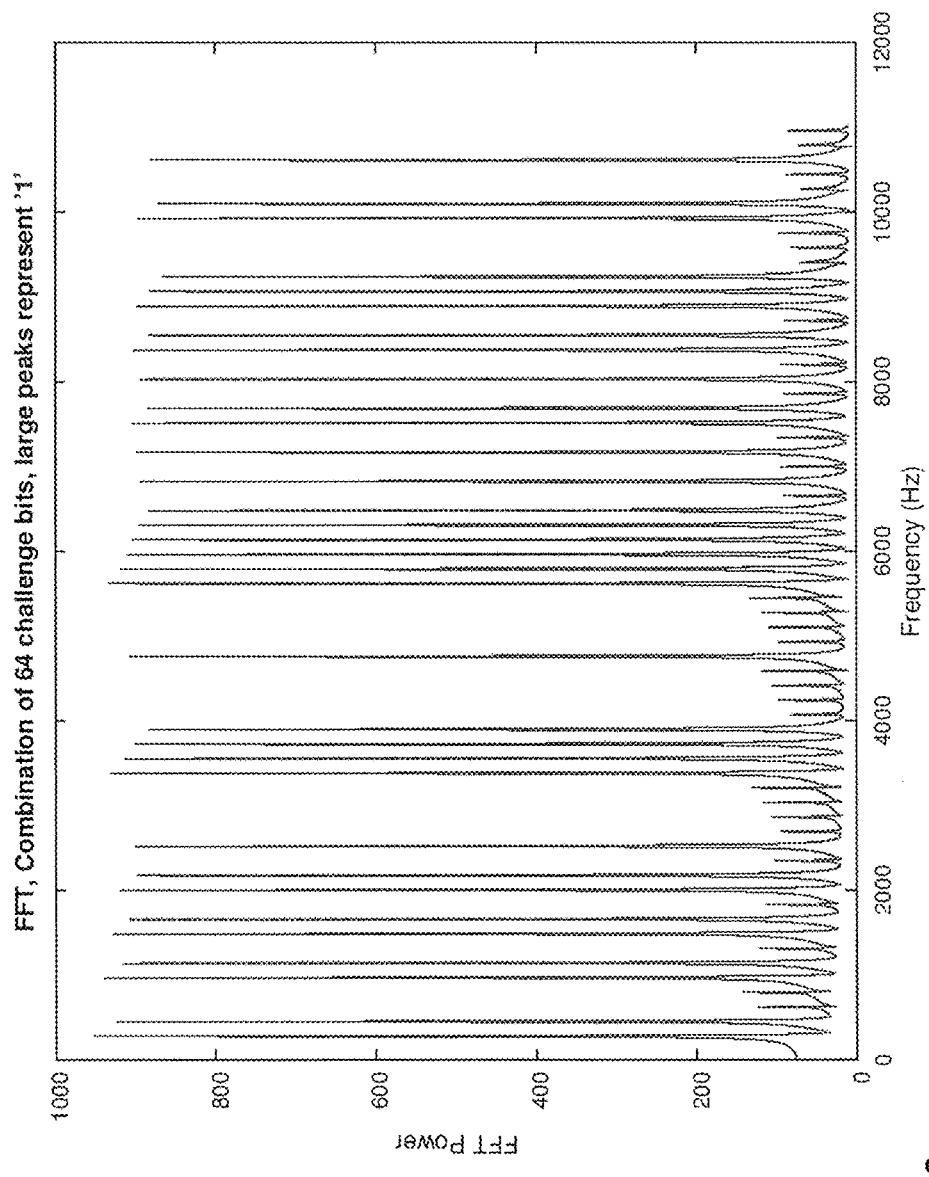
FIG. 6 illustrates yet another alternative exemplifying diagram according to embodiments of the disclosure.

According to yet another alternative, as shown in FIG. 6, a combination of constant tones may be used to encode a challenge. For instance, 64 tones from 100 Hz to 11 kHz spaced at, e.g., 171 Hz intervals may be used, where presence of a tone represents a '1' and absence of a tone represents '0'. The key device 3 can run a discrete Fourier transform (DFT), such as a fast Fourier transform (FFT), on the input and determine which bits are active and which are not.

Alternatively, a melody itself comprised of musical notes—where the musical note "A" for instance is represented by 440 Hz—may comprise a challenge. The melody may be chosen to have musical qualities, yet still random, so that it changes on preferably every key device 3 localization request.

The person skilled in the art realizes that the present disclosure by no means is limited to the preferred embodiments described above. On the contrary, many modifications and variations are possible within the scope of the appended claims. It should furthermore be noted that the drawings not necessarily are to scale and the dimensions of certain features may have been exaggerated for the sake of clarity. Emphasis is instead placed upon illustrating the principle of the embodiments herein. Additionally, in the claims, the word "comprising" does not exclude other elements or steps, and the indefinite article "a" or "an" does not exclude a plurality.

What is claimed is:

1. A method performed by a within-vehicle-confirming system on-board a vehicle for, prior to enabling an operator in possession of a key device to initiate a passive start of the vehicle, establishing that the key device is within an interior of the vehicle, the method comprising:
   providing a vehicle sound signal within the interior of the vehicle, the vehicle sound signal having a duration of time greater than a predetermined minimum threshold, wherein the predetermined minimum threshold is a non-zero and adjustable threshold;
   receiving from the key device a key device signal via a secure communication link, the key device signal being derived from the vehicle sound signal detected by one or more sensors associated with the key device;
   comparing the vehicle sound signal with the key device signal, wherein comparing comprises comparing a time signature of the vehicle sound signal with a time signature of the key device signal or comparing a frequency domain signature of the vehicle sound signal with a frequency domain signature of the key device signal; and
   enabling a passive start of the vehicle when the key device signal matches the vehicle sound signal, wherein enabling comprises enabling a passive start of the vehicle when the time signature of the key device signal matches the time signature of the vehicle sound signal or when the frequency domain signature of the key device signal matches the frequency domain signature of the vehicle sound signal.

2. The method according to claim 1 further comprising: determining that a driving means of the vehicle is inactive; and determining with support from one or more sensors associated with the vehicle, that the operator is deemed to be entering, or has entered, the vehicle.

3. The method according to claim 2 wherein the one or more sensors associated with the vehicle comprise one or more door status sensors to detect opening and closing of a door of the vehicle, the determining that the operator is deemed to be entering, or has entered, the vehicle then further comprises determining with support from the one or more door status sensors, that the door of the vehicle has been opened and subsequently closed.

4. The method according to claim 1,
   wherein the vehicle sound signal comprises an audio signal or an ultrasound signal, or
   wherein the sound signal detected by the key device comprises an audio signal or an ultrasound signal.

5. The method according to claim 1 further comprising providing the key device, via the secure communication link, information pertaining to the vehicle sound signal before providing the vehicle sound signal within the interior of the vehicle, wherein the information pertaining to the vehicle sound signal comprises the duration of time of the sound signal or a modulation frequency of the sound signal.

6. The method according to claim 1 further comprising determining that the secure communication link exists between the vehicle and the key device.

7. The method according to claim 1 wherein the providing the vehicle sound signal within the vehicle comprises providing a randomly generated vehicle sound signal within the vehicle.

8. A within-vehicle-confirming system configured to be on-board a vehicle, the within-vehicle-confirming system configured for, prior to enabling an operator in possession of a key device to initiate a passive start of the vehicle, establishing that the key device is within an interior of the vehicle, the within-vehicle-confirming system comprising:
- a sound providing unit configured to provide a vehicle sound signal within the interior of the vehicle, the vehicle sound signal having a duration of time greater than a predetermined minimum threshold, wherein the predetermined minimum threshold is a non-zero and adjustable threshold;
- a signal receiving unit configured to receive from the key device a key device signal via a secure communication link, the key device signal being derived from the vehicle sound signal detected by one or more sensors associated with the key device;
- a comparing unit configured to compare the vehicle sound signal with the key device signal, wherein the comparing unit is configured to compare a time signature of the vehicle sound signal with a time signature of the key device signal or compare a frequency domain signature of the vehicle sound signal with a frequency domain signature of the key device signal; and
- an enabling unit configured to enable a passive start of the vehicle when the key device signal matches the vehicle sound signal, wherein the enabling unit is configured to enable a passive start of the vehicle when the time signature of the key device signal matches the time signature of the vehicle sound signal or when the frequency domain signature of the key device signal matches the frequency domain signature of the vehicle sound signal.

9. The within-vehicle-confirming system according to claim 8 further comprising: an inactivity determining unit configured to determine that a driving means of the vehicle is inactive; and an entry determining unit configured to determine with support from one or more sensors associated with the vehicle, that the operator is deemed to be entering, or has entered, the vehicle.

10. The within-vehicle-confirming system according to claim 9 wherein the one or more sensors associated with the vehicle comprise one or more door status sensors configured to detect opening and closing of a door of the vehicle, and wherein the entry determining unit further is configured to determine with support from the one or more door status sensors, that the door of the vehicle has been opened and subsequently closed.

11. The within-vehicle-confirming system according to claim 8,
- wherein the vehicle sound signal comprises an audio signal or an ultrasound signal, or
- wherein the sound signal detectable by the key device comprises an audio signal or an ultrasound signal.

12. The within-vehicle-confirming system according to claim 8 wherein the sound providing unit is configured to provide the vehicle sound signal as a randomly generated vehicle sound signal within the vehicle.

13. The within-vehicle-confirming system according to claim 8 wherein the sound providing unit, the signal receiving unit, the comparing unit, or the enabling unit comprises one or more processors.

14. The within-vehicle-confirming system according to claim 8 further comprising one or more processors.

15. The vehicle comprising the within-vehicle-confirming system according to claim 8.

16. The within-vehicle-confirming system according to claim 8 wherein the sound providing unit is further configured to provide the key device, via the secure communication link, information pertaining to the vehicle sound signal before providing the vehicle sound signal within the interior of the vehicle, wherein the information pertaining to the vehicle sound signal comprises the duration of time of the sound signal or a modulation frequency of the sound signal.

* * * * *